No. 845,037. PATENTED FEB. 19, 1907.
A. C. KINTNER.
EYEGLASSES.
APPLICATION FILED OCT. 4, 1905. RENEWED NOV. 12, 1906.
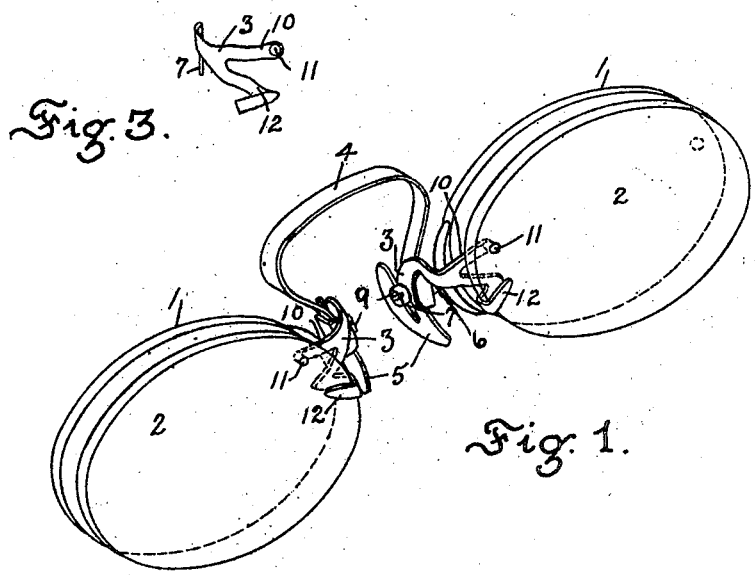
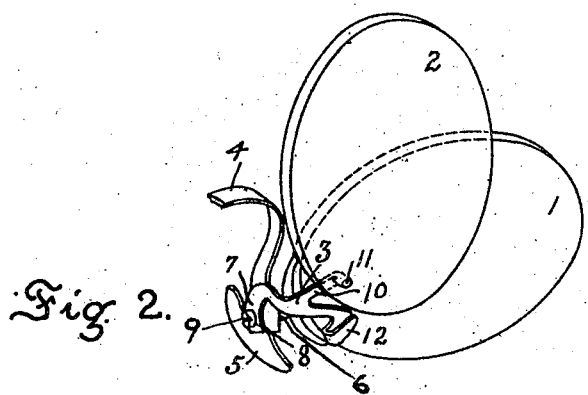
Witnesses:
Justus Riehl
R. P. Buffington
Inventor:
Adrian C. Kintner
By Chapin A. Ferguson
Attorney

UNITED STATES PATENT OFFICE.

ADRIAN C. KINTNER, OF CUMBERLAND, MARYLAND, ASSIGNOR OF ONE-HALF TO WYANT C. MESSMAN, OF CUMBERLAND, MARYLAND.

EYEGLASSES.

No. 845,037.  Specification of Letters Patent.  Patented Feb. 19, 1907.

Application filed October 4, 1905. Renewed November 12, 1906. Serial No. 343,118.

*To all whom it may concern:*

Be it known that I, ADRIAN C. KINTNER, a citizen of the United States, residing at Cumberland, in the county of Allegany and State of Maryland, have invented a new and useful Improvement in Eyeglasses, of which the following is a specification.

This invention relates to improvements in eyeglasses, and has for its object to provide a simple, cheap, and efficient device by means of which smoked or other lenses may be readily attached to the glasses in front of the stationary lenses and may as readily be removed when desired.

The device of my invention is so constructed as not to detract from the looks of the glasses nor interfere with the sight, either when the removable lenses are in position or when not in use, and is also constructed in such a manner as to hold the removable lenses securely in position when in use.

Other features of my invention will be fully set forth in the following specification and pointed out in the claims.

In the accompanying drawings, Figure 1 is a perspective view of a pair of eyeglasses having my invention applied thereto, the smoked lenses being held in the position they occupy when in use. Fig. 2 is a front view. Fig. 3 is a detailed view of the bracket for supporting the removable lenses.

Referring to the accompanying drawings, forming part of this specification, and in which like numerals of reference designate like parts, 1 designates the stationary lens, 2 the smoked or removable lenses, and 3 the bracket for supporting the removable lenses.

The glasses are provided with the usual mountings, comprising a spring 4, nose-pieces 5, and studs 6, to which the stationary lenses are secured.

The brackets 3 have their inner ends 7 bent downwardly and provided with apertures 8 and are held to the studs 6 by means of screws 9, passing through said apertures 8 into the said studs. The outer end of the said bracket is bent at right angles and extends a short distance in front of the stationary lenses and is parallel therewith. The said outer end of the bracket is bifurcated, the upper prong 10 of which is provided with a pivot 11, on which the removable lens 2 swings, and the lower prong 12 is bent outwardly and then inwardly to form a pocket or seat for the removable lens when held in position. The lower prong 12 is bent back sufficiently far to cause the inner surfaces of the said seat to impinge against the opposite sides of the removable lens when in position and hold it friction-tight.

While I have shown the bracket 3 with a bifurcated outer end, it is obvious it may be solid or constructed in any suitable manner, so long as it is provided with a pivot and a seat in close proximity to the said pivot.

To place the smoked or removable lenses in position, they are first placed on the pivot 11 and then moved downwardly until they rest in the seats 12, where they will be securely held, both by their weight and by the friction of the inner surfaces of the seats, as hereinbefore described.

To remove the lenses 2, they are simply swung up on their pivots 11 sufficiently far to free them from their seats 12 and then lifted from said pivots.

Having thus described my invention, what I claim is—

1. The combination with the eyeglasses comprising the usual mountings and the stationary lenses, of the removable lenses, and a bracket having one end secured to the said mountings and provided with a pivot on which the removable lenses swing and a seat below the pivot and adapted to suspend the removable lenses in front of the stationary lenses.

2. The combination with the eyeglasses comprising the usual mountings and the stationary lenses, of the removable lenses, a bracket having its inner end attached to the eyeglasses and its outer end bifurcated and projecting in front of the stationary lenses, the upper prong of the bifurcated end being provided with a pivot on which the removable lens swings and the lower prong being provided with a seat in which the removable lens rests when in position.

3. The combination with the eyeglasses comprising the usual mountings and the stationary lenses, of the removable lenses, and the brackets secured to the said mountings and having a pivot on which the said removable lenses swing and a seat in close proximity to said pivot, said seat being adapted to hold the lenses friction-tight when seated.

4. The combination with the eyeglasses having the usual mountings comprising a spring, the nose-pieces, and the studs, and the stationary lenses, of the removable lenses, and the brackets each having one end secured to one of said studs and having a pivot on which the removable lens swings and a seat below said pivot adapted to hold the removable lenses friction-tight in front of the stationary lenses.

In testimony whereof I have signed my name to this specification in the presence of two subscribing witnesses.

ADRIAN C. KINTNER.

Witnesses:
WYANT C. MESSMAN,
GEORGE A. SIEBERT.